July 22, 1969  A. G. FONDA  3,456,752
STEERING AND DIRECTING MECHANISM
Filed Aug. 18, 1965  2 Sheets-Sheet 1
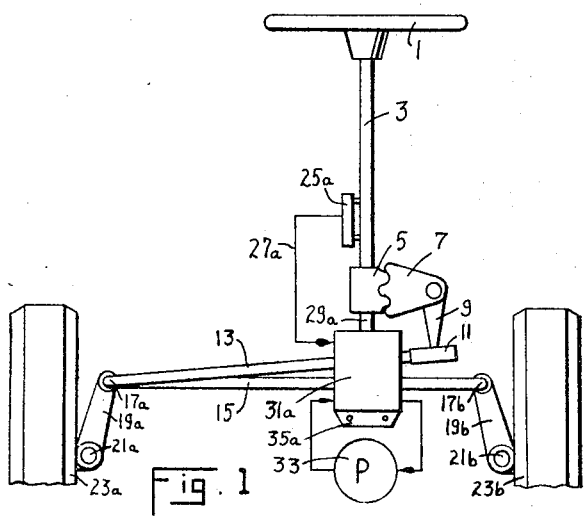
Albert G. Fonda July 22, 1969   A. G. FONDA   3,456,752
STEERING AND DIRECTING MECHANISM
Filed Aug. 18, 1965                                    2 Sheets-Sheet 2

Albert G. Fonda

United States Patent Office 3,456,752
Patented July 22, 1969

3,456,752
STEERING AND DIRECTING MECHANISM
Albert G. Fonda, 481 Stacey Drive,
King of Prussia, Pa. 19406
Continuation-in-part of application Ser. No. 306,569,
Sept. 4, 1963, which is a continuation-in-part of application Ser. No. 107,493, May 3, 1961. This application Aug. 18, 1965, Ser. No. 480,662
Int. Cl. B62d 5/06; F16h 35/00
U.S. Cl. 180—79.2                                           20 Claims

ABSTRACT OF THE DISCLOSURE

Power drive means are arranged to mechanically couple a manually operable directing member with a dirigible member, to effect differential motions of these members while said motions are made responsive to selected effects of directing motion. A closed-loop means of power boost may thus be provided in which motion boost, rather than force or torque boost, is the means of power boost. Further, a closed-loop means of controlling a vehicle or other mechanism may be provided in which the response of the mechanism may modify the control motion applied thereto. Fail safety may be provided by means of locking the power drive means against further differential motion.

---

This invention relates to power drive systems reponsive to a manual effort applied through a distance and, in particular, to a new method for boosting system output power above manual input power and for improving safety and ease of operation both under normal conditions and in the event of loss of boost power. This application is a continuation-in-part of my application Ser. No. 306,569 which was filed Sept. 4, 1963 as a continuation-in-part of my application Ser. No. 107,493 filed May 3, 1961.

Although the present invention has particular applicability to systems for the operation of steerable, course-directing elements of a vehicle, as exemplified by my preferred embodiment herein disclosed, it will be recognized that the principles of my invention may be applied to other uses independently of the nature of the directed elements. My invention will find application wherever an operator can be provided with directing means or elements allowing him to exert an effort through a distance, and where there are prospectively directed means or elements to be moved through a distance by an effort, and where further the directing and directed motions, and the directing and directed efforts, are intended to be smoothly but not necessarily directly related to each other.

Historically, means for augmenting or algebraically adding to the effect of the directing motion upon the directed motion of the steering system of a vehicle have been common. Indeed, they have frequently occurred unintentionally and even inadvertently. For instance, simply because the structure of a vehicle cannot be infinitely rigid, the centrifugal and centripetal forces generated while cornering ordinarily will bend each end of the chassis or otherwise angularly displace each set of wheels, thus providing steering effects in addition to the steering manually imparted. Another example is that, due to the difficulty of allowing roll of the body to occur without influencing the wheel headings, small but significant steering motions adding algebraically to those of the driver ordinarily occur when the vehicle is subjected to a force causing roll. Many other examples of motions additive to those of the driver, occurring usually when side forces are applied, could be given. Such effects, due basically to the necessary complexity of the vehicle, are neither readily analyzed nor easily modified. An object of my invention is to provide means to more readily augment the motion which steers a vehicle, and to do so in response to the same influences which cause existing steering motions, so as to reduce undesired effects or to reinforce desired effects, or to do so in response to new influences so as to provide new effects, while at the same time relieving the design compromises necessary in conventional design.

In more recent years, there has been great public acceptance of power drive systems, especially hydraulic power drive systems, to assist in the steering of vehicles. These accepted systems all boost the effort applied to the directed means to a level exceeding that being furnished, through some mechanical advantage, by the operator alone. This type of system is popular despite an attendant disadvantage of some loss in fidelity of input effort per output effort, the quality commonly referred to as "feel." Such force boost systems all utilize some type of servomotor arranged in mechanical parallel with the operator and made responsive to his applied effort, as will be clarified by reference to my first figures, explained in detail later. The original direct, series mechanical connection between directing means and directed means is conventionally retained. This means that the whole device comprises a linkage in which each element moves in concert with every other element. Major reasons for installation of the servomotor in parallel with an existing linkage are the obviousness of the fact that force boost will reduce the operator effort required; the ease of applicability to existing designs; and the retention of fairly safe control in case of loss of boost power. However, the parasitic drag of the servomotor in the latter event is a handicap and a danger factor, as is the possible inadvertent change in position of both directed and directing elements upon sudden loss of servomotor effort formerly helping to hold the vehicle in an existing curved path. An object of my invention is to allow avoidance of the parasitic drag and of the change in effort required in case of loss of boost power, while also providing, during normal operation, the utmost fidelity of "feel" through the mechanism.

Less conventional types of power drive systems which have met with some popularity are remote control systems and mechanically nonlinear boosted systems. Remote control systems, in which the servomotor mimics the motions of the operator without regard to either input or output effort, have been used in very large vehicles and in systems where a direct mechanical linkage between directed and directing means is not feasible or would serve no useful purpose. Sometimes, for the sake of feel, a second servomotor is used to transmit back to the operator a function of the effort required of the first servomotor, or of other effects in the directed mechanism. Mechanically nonlinear systems have been obtained by cutting gears with pitch radius varying along their circumference, or by other means, so that the output motion varies nonlinearly with the input motion. The force ratio meanwhile varies inversely as the motion ratio. By providing a high ratio of input motion to output motion at center, decreasing away from center, the directed means can be more delicately controlled at center and yet more rapidly controlled for large motions away from center, as in parking. While this is a merely mechanical arrangement, it is made practical by power steering, which can be arranged to give correspondingly varying boost and thereby provide the high forces which the nonlinear linkage requires when the motion ratio is low and the force ratio therefore high. An object of my invention is to provide simpler and more flexible means of accomplishing the variations in input-output motion relationship permitted by the two types of devices just described, while providing in a simple manner the "feel" effect which is either absent or is provided, in each, so laboriously and with such loss of fidelity.

Other proposals directed to these problems involve the return of and response to intelligence from the directed mechanism or vehicle. This intelligence is used to augment the boost effort, in the case of otherwise conventional force boost, or to augment the remote motion, in the case of remote control. The disadvantages of these systems include in the first case the difficulty of accommodating wide variations in the willingness or ability of the operator to comply with the urgings of the augmenting effort, and in the second case the absence of or difficulty of providing either high-fidelity "feel" or a fail-safe direct mechanical interconnection between the operator and the vehicle or other mechanism. An object of my invention is to avoid these disadvantages while providing responsiveness of the power boost system to intelligence returned from the directed mechanism.

Other objects and advantages will be apparent upon consideration of the present disclosure in its entirety.

It is my proposal to provide a power boost system embodying motion boost rather than force boost. Either motion boost or force boost does provide power boost, since the product of motion and force (or, more generally, effort) is power. Yet the possibility of motion boost rather than force (effort) boost has been universally ignored. The mechanism for doing so involves arrangement of the servomotor mechanically in series with the operator, rather than in parallel, so that the motion of the servomotor, rather than the effort of the servomotor, is added to that of the operator. It also involves a servomotor arranged so that the motion of the servomotor regardless of effort, rather than its effort regardless of motion, is controlled, and further involves a servomotor control system which can be made responsive to the directing motion, rather than the directing effort. This response may be intentionally nonlinear. The control system may also or alternatively be responsive to intelligence returned from the directed mechanism, this being especially useful in the case of vehicle control. Fail safety is provided in my invention by causing the servomotor to lock up entirely in case of failure, rather than to attempt the opposite and more difficult task of causing the servomotor to move freely in case of failure.

The provision and modulation of power suitable for power boost may be accomplished by various means, the power being at some stage in the process possibly hydraulic, pneumatic, or electrical but always, in the final stage, mechanical. This is in keeping with definition of a servomotor as a mechanical-output amplifier, a motor suitably sensitive to some command signal which supplies little if any of the modulated mechanical output power (effort times distance). Feedback of output intelligence to the input is commonly used to stabilize the amount of output per unit input and to desensitize the motor to other influences; I do not mean to exclude this option in any instance, nor to otherwise restrict the nature of the servomotor and its controls, provided they implement the principles of my invention.

In the accompanying drawings, a diagrammatic representation replaces the pictorial when it is desired to show, apart from the superficiality of any particular component, the essence of the function or functions performed by that type of component. While I provide an illustrative preferred embodiment this is done by way of explanation only; many other embodiments will be evident, to one skilled in the art, within the principles of my invention.

FIG. 1 is a plan view of the steering mechanism of an automotive vehicle embodying conventional power boost applied as a torque;

FIG. 2 is an abbreviated view of the same mechanism but with a different type of servomotor;

FIG. 3 is a block diagram applying to both;

FIG. 4 is a plan view of the steering mechanism of an automotive vehicle embodying power boost according to my invention;

FIG. 5 is an abbreviated view of the same mechanism but with a different type of servomotor;

FIG. 6 is a block diagram applying to both;

Figure 7A:
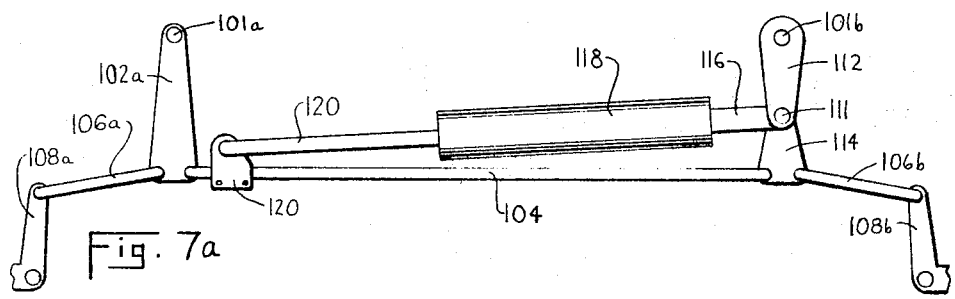
FIG. 7 is an elaboration of FIG. 5, selected as a preferred embodiment, and comprised of FIG. 7a through FIG. 7f.

In order to clarify the distinctions between conventional power boost and my invention, FIGURES 1, 2, and 3 show representative features of conventional systems as used in automobiles, while FIGURES 4, 5, and 6 show similar steering systems built according to the teachings of my invention. In the pictorial representations, using chiefly odd numbers, a conventional manual steering mechanism is comprised of elements 1 through 23; the conventional boost system therefor is comprised of elements 25 through 35; and my power drive system therefor uses elements 41 through 51. The corresponding block diagrams use corresponding even numbers.

The conventional power boost system of FIG. 1 aids the driver in exerting torque on the worm gear 5, thereby to move the remaining parts of the steering linkage. Coupling 29a transmits the torque of servomotor 31a while bracket 35a reacts this torque to the vehicle chassis. Sensor 25a responds to the driver torque in shaft 3 and transmits a resulting signal to command the servomotor to develop boost torque accordingly. Pump 33 provides the necessary power.

Another conventional power boost system, shown in FIG. 2, adds force at a tangential location, rather than torque. Fitting 29b transmits the thrust of servomotor 31b while bracket 35b reacts this thrust to the vehicle chassis. Sensor 25b responds to the driver thrust tending to bend lever 9 and transmits a resulting signal to command the servomotor to develop boost thrust accordingly.

The flow of influences common to both mechanisms is shown in FIG. 3. The operator 2 affects the load 6 by means of force F through a mechanical ratio 4a of magnitude K (conventionally large relative to unity). The load moves according to the force applied, and this motion affects that of the operator through the ratio 8a again of magnitude K. (Of course, it could have been said with equal validity that the motion is the cause and the force is the effect, but the opposite convention best serves our purpose here.) Power boost is added by means of the force sensor 26 and the servomotor 28, which delivers to the force summing point 30a a force JF to supplement the manually induced force KF. This summing point might equally well have preceded the ratio K, as shown at 30b, with no effect on the sum $(K+J)F$ if the servomotor gain were adjusted accordingly. The servomotor output per operator input may be stabilized by use of a second sensor 16, which senses servomotor output force and delivers a signal for comparison with the signal due to F, any discrepancy between J times F and the servomotor force being amplified to correct the servomotor force to its intended value JF. In any event, the power to the load is the product of its displacement D and the total force $(K+J)F$, as indicated by the rectangle in FIG. 3 in which the shaded area denotes the boost power JFD.

In FIG. 4, the same manual steering elements are modified according to my invention. The steering shaft 3 now terminates short of the worm gear 5, leaving a gap filled only by the servomotor 49a. The rotor of the servomotor is attached to shaft 3, while the stator or what is commonly called the stator is attached through coupling 51a to the worm gear 5. The servomotor is thus rendered incapable of reacting torque to the chassis; it is no longer in parallel, but rather in mechanical series with the manual linkage. It thus adds not force (or torque) but motion to that of the operator. Sensor 43a, which is connected to shaft 3 through cable 41a wound around shaft 3 and is anchored at 45a to the chassis, senses the motion of shaft 3 and transmits a resulting signal to command servomotor 49a to develop boost motion accordingly. Pump 33 provides the necessary power.

The push-pull version of the same system is shown in FIG. 5. The link 13 now terminates short of the lever 9, leaving a gap filled only by the servomotor 49b, of which the housing is attached through fitting 51b to the lever 9. The servomotor is thus rendered incapable of reacting thrust to the chassis; it is in mechanical series with the manual linkage, and adds not force but motion to that of the operator. Sensor 43b, which is connected to lever 9 through rod 41b and is anchored at 45b to the chassis, senses the motion of lever 9 and transmits a resulting signal to command servomotor 49b to develop boost motion accordingly.

The flow of influence common to both mechanisms is shown in FIG. 6. In this case, the option of showing load force due to load motion is selected. The operator 2 affects the load 6 by means of motion D through a mechanical ratio 4b of magnitude k (the inverse of K, hence smaller than unity). The resulting load force then affects that of the operator through the ratio 8b, again of magnitude k. Power boost is added by means of the motion sensor 42 and the servomotor 44, which delivers to the motion summing point 46a a motion jD to supplement the manually induced motion kD. This summing point might equally well have preceded the ratio k, as shown at 46b, with no effect on the sum $(k+j)D$ if the servomotor gain is adjusted accordingly. The servomotor output per operator input may be stabilized by use of a second sensor 48, which senses servomotor output motion and delivers a signal for comparison with the signal due to D, any discrepancy between j times D and the servomotor displacement being amplified to correct the servomotor displacement to its intended value jD. In any event, the power to the load is the product of its displacement $(k+j)D$ and the force F, as indicated by the rectangle in FIG. 6 in which the shaded area denotes the boost power jFD.

Comparison of the two types of system shows that my servomotor has been placed in the location conventionally assigned to the force or torque sensor, namely in series with the manual linkage; further, my sensor has been placed in the location conventionally assigned to the servomotor, namely in parallel with the manual linkage, and therefore anchored to ground. It should be recalled that mechanical series and mechanical parallel can sometimes be disguised; for instance, a mechanical differential could be placed in the location of 49a in FIG. 4, allowing a servomotor to drive the differential while being bolted to the chassis and reacting torque to the chassis. However, an equal and opposite torque would also be reacted to the chassis by the case of the differential, giving zero total reaction to the chassis, as expected for a series arrangement. Analogously, a lever could be interposed in link 13, arranged to allow differential action from a servomotor anchored at its other end to the chassis. The mere criterion of whether a servomotor is or is not anchored to the chassis thus does not uniquely distinguish my invention, although it is indeed a good initial guide when supported by recognition of differential action if any, and ultimately by proper determination of whether the servomotor is mechanically in parallel with the operator and must move in concert with him (but at an independent force level), or is in series and can move independently (but at a dependent force level).

Figure 7B:
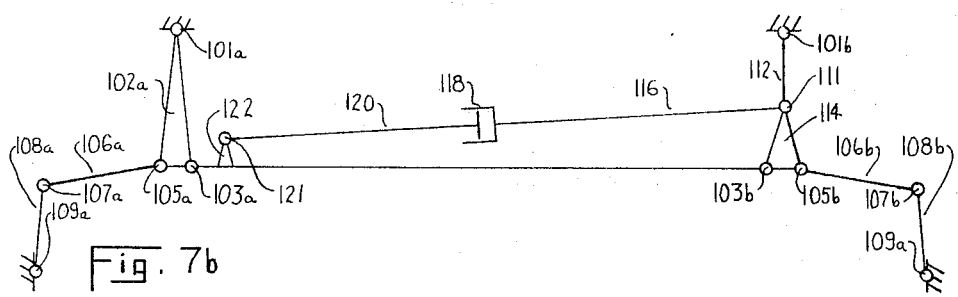

A more detailed embodiment similar to that of FIG. 5 is shown in FIG. 7a. Here, the original linkage (before addition of my power steering) was symmetric laterally, by virtue of a translating link 104 and idler arm 102a giving duplicate motions of the side links 106a, 106b and hence of the steering arms 108a, b in response to the motion of the gearbox arm, no longer shown, corresponding to the idler arm 102a and of the same length but carried by the gearbox shaft at pivot 101b. In introducing my power system to this linkage, the gearbox arm is shortened to arm 112 carrying pivot 111, to which are also connected short idler arm 114 and power cylinder or actuator body 118 via fitting 116. Piston rod 120 then extends from the actuator body to bracket 122 clamped to translating rod 104. FIG. 7b shows a line-diagram version of the same elements interconnecting the same pivots.

Figure 7C:
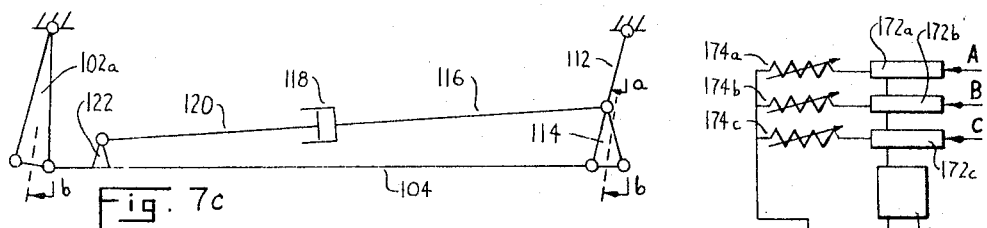

The action of the linkage so arranged is as follows. If the actuator takes no action, the result shown in FIG. 7c occurs when gearbox arm 112 is rotated through an angle a. Pivot 111 moves to the left some distance, causing all the members 104, 114, 116, 118, 120, 122 to move to the left the same distance. This causes arm 102a to swing through some angle b, less than angle a. This means that the steering ratio (input motion per output motion) has been increased, since formerly the longer gearbox arm would have needed to move only through the angle b, as shown by the broken line from pivot 101b through the midpoint between pivots 102b and 103b. This increased steering ratio means more motion but less effort on the part of the operator. An effort level compatible with conventional power steering can thereby be achieved, although at the expense, to this point, of requiring a number of turns lock-to-lock generally regarded as excessive, this being the reason for not having originally adopted such a high ratio.

Figure 7D:
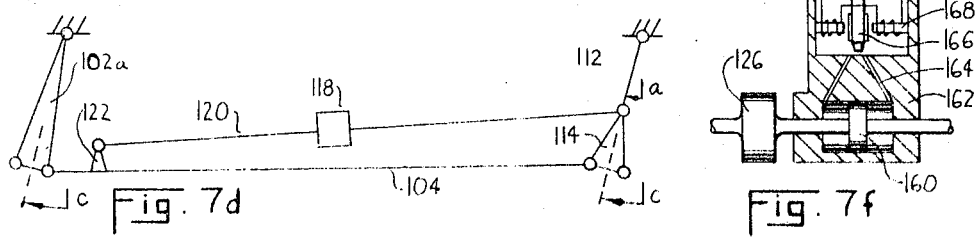

But the disadvantage of high ratio is overcome by my invention. Shown in FIG. 7d is the effect, relative to FIG. 7c, when the actuator causes motion of piston rod 120 to the left. Elements 112, 116, 118 remain fixed but elements 120, 122, 104, and 114 move to the left, causing idler arm 102a to assume a new angle c, greater than b, for instance equal to a as has been illustrated. In this manner, the motion ratio is returned for instance to its original, manual-steering level, or if desired even further, for instance to the usual level for power steering. This reduces the amount of operator motion required to achieve a given directed motion. Meanwhile, the force ratio has remained at the low level achieved by the shortening of the gearbox arm as in FIG. 7c. It is clear, then, that the motion augmentation feature of my invention can be used in combination with a change in the mechanical ratio of the linkage to achieve the same final motion ratio and the same final force ratio as have been found desirable in conventional power steering. If that is the effect desired, the prime advantage of my means of achieving this effect is the absolute fidelity of the force ratio; that is, the excellent "feel" of a power steering device wherein the power assist device is incapable of adding any spurious feel forces, and the steered wheels or directed elements are, as with manual steering, directly and exclusively connected with the operator.

Figures 7E, 7F:
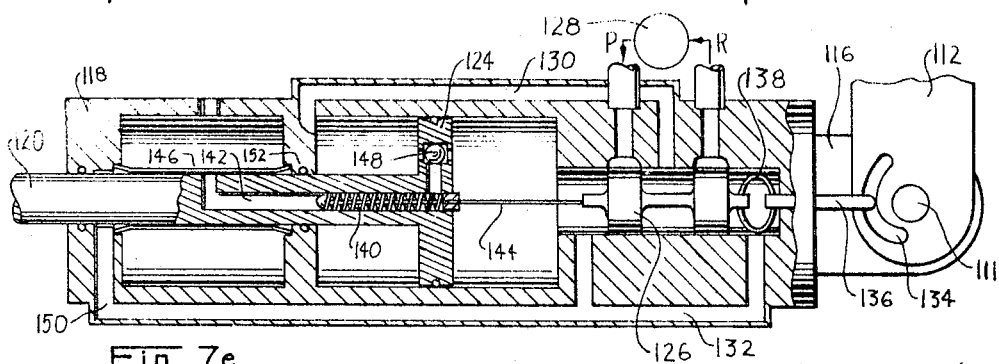

Some details of possible internal configuration of the actuator are shown in FIG. 7e. Right-end fitting 116, actuator body 118, and piston rod 120 appear again. The differential pressure to act on piston 124 is controlled by spool 126 by movement axially to connect pressure and return sides of the pump 128 respectively to opposite sides of the piston. When spool 126 is moved to the right it connects pressure to the right side of the piston through the extension of the bore for the spool into the bore for the housing, and simultaneously connects the return to the left side of the piston through the radial passageways and tube 130. The converse connections occur when the spool moves to the left, return then being accomplished through the tube 132. The circumferential distance along which the pressure and return ports extend may be made greater for the larger (right) end of the cylinder, which uses more flow, than for the smaller end (diminished by rod area).

A spool of the type shown is often operated by another stage of hydraulic amplification, for instance a flapper-nozzle stage, operated in turn by an electromagnetic motor, sensitive to conveniently low-power signals. This type of component is not meant to be excluded, but its cost may be avoided when the signals to which the spool must respond are not of such low power. I illustrate derivation of the spool-positioning forces from opposed springs transmitting force according to command motion and actuator motion respectively. Command or operator motion appears as angular motion of gearbox arm 112 relative to fitting 116, for instance through angle *a*. The slot 116 transfars this motion to translation of push rod 136 to the right, relative to the body 118, whenever the operator moves pivot 111 to the left as in FIG. 7c. Through spring-ring 138, this pulls the spool 126 to the right, opening pressure to the right side of the piston. As the resulting force overcomes load resistance, the piston rod moves to the left, thereby compressing spring 140 which is housed in bore 142 of the piston rod and is anchored via wire 144 to the spool. The increasing force in spring 140 deforms spring-ring 138 enough to again center the spool and close the valve ports just as piston rod 120 reaches the desired position such as that illustrated in FIG. 7d. Thus, the two springs are finally both deflected oppositely and in inverse proportion to their rate so as to achieve a force balance on the spool only after the piston has been made to move to some position corresponding to the operator's input position. This action will occur so rapidly, when the system is properly sized, that the operator will be completely unaware of the slight lag of the augmenting motion during the cycle of events in the hydraulic system.

Any desired sort of nonlinearity may be designed into the system by choice of the contour of the slot 134. For instance, the slope of the slot may be zero at the centered position, giving no augmenting motion for very small inputs, and may then increase in slope progressively to its ends so as to give a maximum rate of motion boost for the largest input motions, such as those used in parking. Since only small motions are used at high speed, this nonlinear motion boost gives a less highly variable relationship between steering motion and the lateral acceleration resulting, as forward speed varies.

In case of loss of boost power, it is desirable to prevent free motion of my motion boost device, lest directing and directed motion become entirely unrelated. Wtih the conventional servo value, loss of hydraulic pressure to the first stage leaves the spool stuck at center, thereby locking the piston against further motion in the cylinder. While some modifications to the valve are possible to maximize this effect, or interlock valves may be installed to stop all flow out of the cylinder in case of loss of supply pressure, a more reliable arrangement is shown. In the forward extension of actuator body 118, an extension which serves first the purpose of rod support against cocking in the actuator body, there is a thin-walled cylinder machined with an interference fit to the piston rod, but normally held away from the rod by internal pressure. While this is a known technique for providing braking action on the rod, my means of pressure control is novel. Ordinarily, sleeve 146 might be expanded by the same pressure delivered from the pump to the servo-valve. However, this requires external plumbing and further does not guarantee against loss of cylinder pressure without loss of supply pressure, for instance due to a stuck valve combined with a cylinder leak. In my arrangement, delocking pressure is provided through piston bore 142 which also holds the spring 140. This bore receives pressure from one side or the other of the piston 124, whichever is higher, as the ball 148 shuttles right and left according to pressure differential. If pressure is lost, the ball cannot block both adjacent flow paths, and allows loss of pressure in bore 142 until sleeve 146 locks rod 120. This assures safety against any hydraulic failure whatsoever, a feature not possible when the locking action requires the presence rather than the absence of fluid.

This locking action will be smooth and jerkless. For instance, if tube 130 is ruptured while the piston and hence the ball are being forced to the left, the desired motion to the left will merely continue until all the fluid which the spool 126 can pass has been passed, whereupon the pressure on the right side of the piston and hence in the rod bore 142 will drop, and the sleeve 146 will therefore lock to the rod. If the same failure occurs when the piston and ball are being forced to the right, the pressure on the piston and in the rod bore will begin to fall immediately; the piston will fall farther behind its intended position; the spool 126 will therefore move to give even more flow, thus exhausting the right side of the piston to return; thus the ball will remain to the right side of the piston, and the pressure in the bore will drop until the sleeve 146 locks on. Thus, in either case the desired (commanded) motion continues as long as possible despite the hydraulic failure, and then simply ceases to occur, with absolutely no intervening spurious motion or undesired transient. The gain of the motion boost system, in other words, simply drops progressively to zero in case of hydraulic failure.

An alternate means of pressurizing the sleeve 146 is shown by tube 150, not otherwise used, extending from tube 132 to the piston rod circumference just to the left of the sleeve. Pressure applied here will expand the left end of the sleeve and indeed will expand all of the sleeve into a slightly conical shape as flow proceeds to the right to return to the lower pressure at the left side of the piston, seal 152 having been dispensed with. Conversely, if pressure is higher on the left side of the piston than on the right, the direction of flow and the direction of taper will be reversed. If both pressures are the same, both will aid in expanding the sleeve to a cylindrical shape. In any case, loss of pressure in the cylinder will lock the sleeve. The arrangement involving ball 148 and bore 142 would not be used.

Regardless of the exact means used to provide actuator lockup in case of loss of power boost, it is the inherent characteristic of my device to achieve a very smooth transition from boosted to unboosted condition. It is basically much less disturbing to the operator to have a power boost system fail to continue to supplement his motion, provided it does maintain previously added motion, than to have a power boost system fail to maintain force boost, returning necessarily (since boost power is no longer available) to unboosted force level. In the latter event, usually the operator would inadvertently allow the sudden rise in control force to cause undesired control motion, before he can become aware of and correct for the loss in boost. In my invention, there is no such induced transient. Instead, there is merely a gradually accumulating difference between where the directed member is and where it would have been at that time if boost had not been lost. If the operator is paying proper attention to the effects of his directing motion, for instance the path of the car on the road, he will merely supply the extra directing motion required with only a vague realization, if any, that more motion is being needed than usual. This effect would be most noticeable in parking, which is not a dangerous situation, and least noticeable at high speed, where little motion boost is used. In the conventional force boost system, loss of boost is always quite noticeable and is increasingly dangerous as the speed of the vehicle increases.

A means of making the motion boost system sensitive to intelligence returned from the directed mechanism is shown in FIG. 7f. This illustrates a conventional servo-valve, or the first stage thereof, adapted to operate spool 126 as its second stage with built-in position feedback as previously described. Attached to spool 126 is piston 160 in housing 162, which may fit on the end of actuator housing 118. Piston 160 is forced to move by pressure through passages 164 from jet pipe 166 which is supplied with pump pressure and swings left and right about a pivot at its upper end in response to current in coils 168. This current is supplied by amplifier 170 and modulated by any desired number of sensors 172 in response to relevant quantities A, B, C and so on which are quantities detectable in the mechanism, directed and directing portions inclusive. The gain or degree of influence of each sensed quantity may be controlled or set to zero by the respective gain adjuster 174. The elements 134, 136, 138 may be retained as before to apply a force to the spool corresponding to directing motion. The same type of function may be performed by one of the sensors 172, say 172a, thereby to modify the effect of elements 134, 136, 138, or to replace that effect if those elements are not retained. The mechanical type of force transfer to spool 126 is more reliable and less expensive, but the electrical type is more flexible (amendable to adjustment and redesign) if the valve is for other reasons sensitive to such signal.

Sensors 172b, 172c, and so on may be connected to accelerometers or gyroscopes in the vehicle, or may be connected to the suspension springs or shock absorbers, for example. In any case, connection is made to an element of or in the vehicle in which force or motion is a quantity relevant to the control of the vehicle. The same type of connection is made if the directed mechanism is not a vehicle.

When sensing means 172b is a yaw velocity sensor and the vehicle's wheels are made to steer oppositely to the direction of turn of the vehicle it will result that, when negotiating a turn at high speed, the necessary manual control motion is greater than at low speed, thereby decreasing the sensitivity of the vehicle to steering motion at high speed. In effect, this provides an increase of the vehicle's steering ratio, though without any reduction of the force ratio, that is, without loss of feel of the wheel. Further, during operation on a low-friction surface, in case of rear-end breakaway the vehicle will start to yaw rapidly, whereupon piston 124 will be caused to impart steering opposite to the direction of yaw, which will be steering in the direction of skid and will greatly aid, especially due to its promptness, in the control of the skid. The same effect is obtained when the yaw of the vehicle is due to side winds; whichever way the vehicle yaws it will be steered opposingly, reducing its tendency to depart from its original course. Thus, a substitute for aerodynamic stabilization is provided.

When sensing means 172c is a lateral accelerometer and resulting steering is to the left when the vehicle accelerates to the right, or the converse, a similar reduction of vehicle sensitivity to control motion is obtained. The main distinction is that, as lateral acceleration on a curve of given radius varies as the square of forward velocity (speed), rather than linearly therewith as for yaw velocity, the effect of the accelerometer is a stronger function of speed. Steering provided in case of skid is minor because acceleration is then minor, but upon return to a high-friction surface there will be immediate steering in the direction of continuing skid, reducing the jerk due to recovery of lateral traction, thereby avoiding loss of control due to overcontrol. Steering in case of side winds is beneficial in a different manner than before; even if the side wind causes no yaw, it causes lateral acceleration and hence opposed steering, while if the wind does cause yaw then this in turn causes side acceleration, inducing opposing steering.

While the use of only three types of sensed signal have been illustrated in this embodiment, any other significant vehicle behavior or control behavior parameters and/or time functions thereof can be similarly utilized to energize the actuator. Also, the manner of energization can assume various forms, as was illustrated in the case of the directing motion; it is often possible to use more power at the sensor and thereby avoid the expense of amplifying a low-power sensed signal.

From the foregoing it will be seen that my invention provides a steering and directing mechanism in which a direct mechanical connection between operator and directed mechanism continually provides a fixed force ratio for fidelity of feel, but provides for the interposition of motion between operator and directed mechanism, and also provides a fail-safe feature in which loss of hydraulic pressure causes the further interposition of motion to cease without any disturbing transient. Having disclosed certain embodiments for the purpose of illustration, it is to be understood that changes may be made and certain features may be used without others without departing from the proper scope and fair meaning of the claims which follow.

I claim:

1. In a vehicle or the like, a steering and directing mechanism, unassisted by any other power boost means, including a directing member operable in a selected mode of motion, a coupling connected in series with said directing member and a dirigible member, for coupling said motion to that of said dirigible member, power drive means interposed in said coupling, including a power source, a first element coupled with said directing member in its selected mode, a second element coupled with said dirigible member, and actuating means for the movement of either of said elements with respect to the other essentially exclusively by means of reaction of each against the other, and power modulating means for controlling said actuating means, including at least one element responsive to a selected effect of the motion of said directing member in said selected mode.

2. Mechanism as in claim 1, wherein said power drive means is a fluid servomotor interposed in said coupling.

3. Mechanism as in claim 2, in which said fluid servomotor includes at least two expansible chambers, of which one increases in volume as another decreases, whereby said movement of either of said elements with respect to the other is induced, and said power modulating means includes valve means modulating the flow of a working fluid from a pressure source selectively into one side of said servomotor while permitting escape of working fluid from the other side of said servomotor.

4. Mechanism as in claim 3, wherein fluid conduits conduct said working fluid to an expansible chamber operatively coupled to a yieldable element, deforming said yieldable element upon the entry of said fluid, and further coupled to disengage a selectively engageable and disengageable coupling between said directing and dirigible members upon the entry of said fluid as said working fluid reaches a pressure sufficient for proper operation of said fluid servomotor and to engage said engageable coupling upon the exit of fluid as said fluid reaches a pressure insufficient for proper operation of said fluid servomotor.

5. Mechanism as in claim 4, wherein said fluid conduits conduct fluid from one of said expansible chambers of said fluid servomotor through a flow-operated check valve, in the free-flow direction, to a juncture, and from one of the opposed expansible chambers of said fluid servomotor through a second flow-operated check valve, in the free-flow direction, to said juncture, and from said juncture to the said expansible chamber coupled to yieldable element, and wherein the movable sealing elements of said check valves are linked so that either in turn, but not both, can prevent reverse flow from said juncture to said servomotor.

6. Mechanism as in claim 4, wherein said expansible chamber is an annular volume between two concentric members fabricated with an interference fit therebetween, the yieldable element is at least one of the respective concentric members deformable to increase the radial clearance between members as fluid is interjected therebetween, and said concentric members also comprise said engageable coupling, operably connected to transmit the motion of said directing member from one of said concentric members to the other and thence to said dirigible member whenever the pressure of said fluid interjected between said concentric members is insufficient to increase the radial clearance between said members to the point of disengagement thereof.

7. Mechanism as in claim 6, wherein said fluid conduits conduct fluid to one axial end of said concentric members from one of said expansible chambers of said fluid servomotor, and to the opposite axial end of said concentric members from one of the opposed expansible chambers of said fluid servomotor, and wherein the annular clearance between said concentric members is restricted to limit the flow and loss of power from said power source.

8. Mechanism as in claim 1, a selectively engageable and disengageable coupling between said directing and dirigible members, and an actuator energized from said powed source, for disengaging said coupling when so energized and for engaging said coupling when not so energized from said power source.

9. Mechanism as in claim 1, and a terrestrial vehicle including elements for changing the direction of motion of the vehicle in response to said motion of said dirigible member, wherein said directing member is a manually operable steering member.

10. Apparatus as in claim 9, wherein said elements for changing the direction of motion of the vehicle are the steerable front wheels of the vehicle and said steering member is a hand steering wheel.

11. Apparatus as in claim 9, including means whereby one of said responsive elements of said power modulating means is responsive to the yaw velocity of said vehicle, for actuation of said power drive means to effect steering of said vehicle in opposition to said yaw velocity.

12. Apparatus as in claim 9, including means whereby one of said responsive elements of said power modulating means is responsive to the lateral acceleration of said vehicle, for actuation of said power drive means to effect steering of said vehicle in opposition to said lateral acceleration.

13. Mechanism as in claim 1, including means whereby one of said responsive elements of said selected power modulating means is responsive to the departure from a selected initial position of said directing member in said mode, for actuation of said power drive means to effect supplemental motion of said dirigible member from its corresponding initial position.

14. Mechanism as in claim 13, including means to effect greater supplemental motion per unit of said departure when said departure is greater and less when said departure is less, through at least part of the range of motion of said directing member, for non-linear response of said dirigible member to said directing member.

15. Mechanism as in claim 1, including means whereby motion of one of said responsive elements of said power modulating means is transmissible to said modulating means through a yieldable element, and means whereby effort responsive to a second responsive element is independently transmitted to said power modulating means, said effort acting against said yieldable element for the actuation of said power modulating means according to the difference between said last mentioned motion and the deformation of said yieldable element due to said effort.

16. Mechanism as in claim 15, including means whereby motion of said second responsive element is transmissible to said power modulating mean through a second yieldable element, for the application of said effort according to the deformation of said second yieldable element.

17. Mechanism as in claim 1, including means whereby one of said responsive elements is responsive to said movement of either element with respect to the other, for inducing counter-actuation of said power drive means, and means whereby said power drive means is highly responsive to the resulting sum of the selected effects, for inducing last said movement in amounts more accurately and more exclusively responsive to the remaining selected effects.

18. Mechanism as in claim 1, wherein said power drive means is an electrical servomotor interposed in said coupling.

19. Mechanism as in claim 1, wherein said power drive means is a mechanical servomotor interposed in said coupling.

20. A steering and directing mechanism for vehicles and the like, including a directing member operable in a selected mode of motion, a coupling connected in series with said directing member and a dirigible member, for coupling said motion to that of said dirigible member,
power drive means interposed in said coupling, including a power source, a first element coupled with said directing member in its selected mode, a second element coupled with said dirigible member, and actuating means for the movement of either of said elements with respect to the other essentially exclusively by means of reaction of each against the other, and
a selectively engageable and disengageable coupling between said directing and dirigible members, and an actuator energized from said power source, for disengaging said coupling when so energized and for engaging said coupling when not so energized from said power source.

References Cited

UNITED STATES PATENTS

| | | | |
|---|---|---|---|
| 2,917,027 | 12/1959 | Hayse | 180—79.2 |
| 3,191,109 | 6/1965 | Hepner | 180—79.2 |
| 3,205,984 | 9/1965 | Gomez | 180—79.2 |
| 3,241,630 | 3/1966 | Snabes | 180—79.2 |
| 1,467,209 | 9/1923 | Sumner | 180—79.2 |
| 1,790,620 | 1/1931 | Davis | 180—79.2 |
| 1,959,177 | 5/1934 | Sassen | 180—79.2 |
| 2,410,049 | 10/1946 | Davis | 180—79.2 |
| 2,754,465 | 7/1956 | Brier | 180—79.2 X |
| 3,011,579 | 12/1961 | Milliken et al. | 180—79.2 |
| 3,033,051 | 5/1962 | Reinke et al. | 180—79.2 X |

LEO FRIAGLIA, Primary Examiner

JOHN A. PEKAR, Assistant Examiner

U.S. Cl. X.R.

74—388